A. REASON.
THRESHING MACHINE.
APPLICATION FILED AUG. 23, 1909.
990,007.
Patented Apr. 18, 1911.
3 SHEETS—SHEET 3.
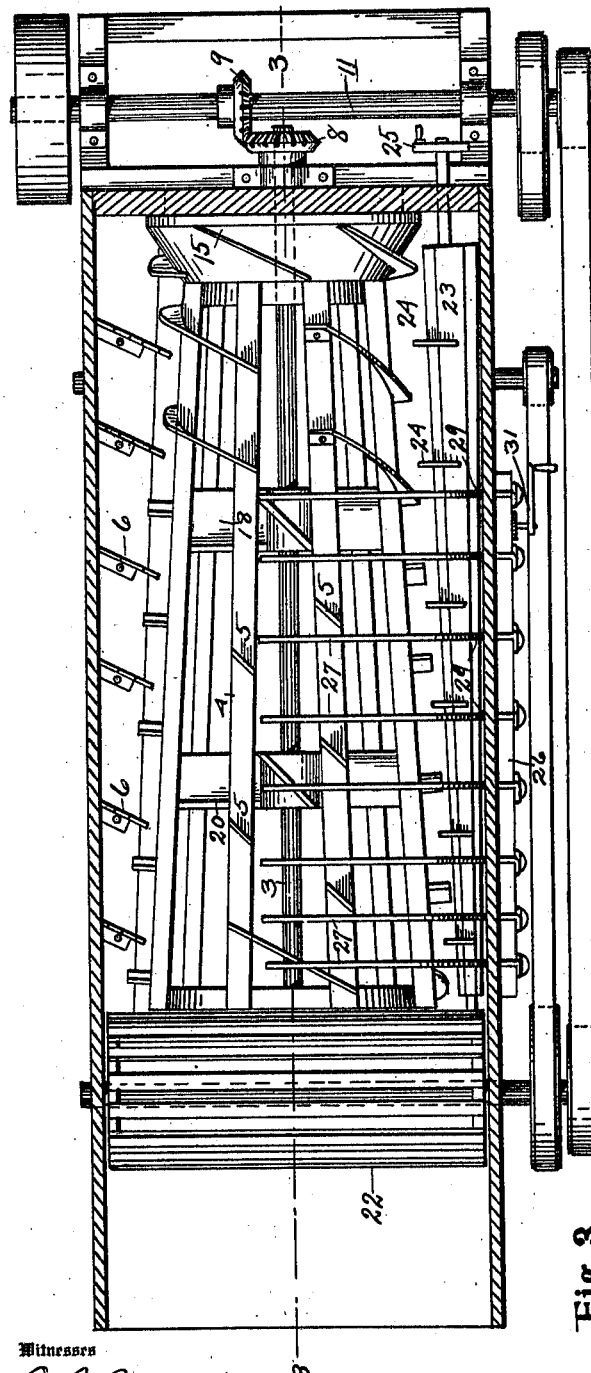
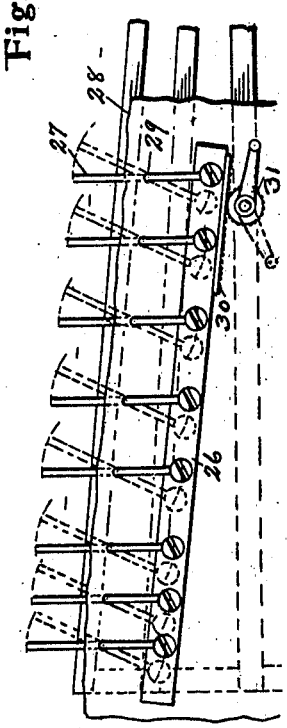

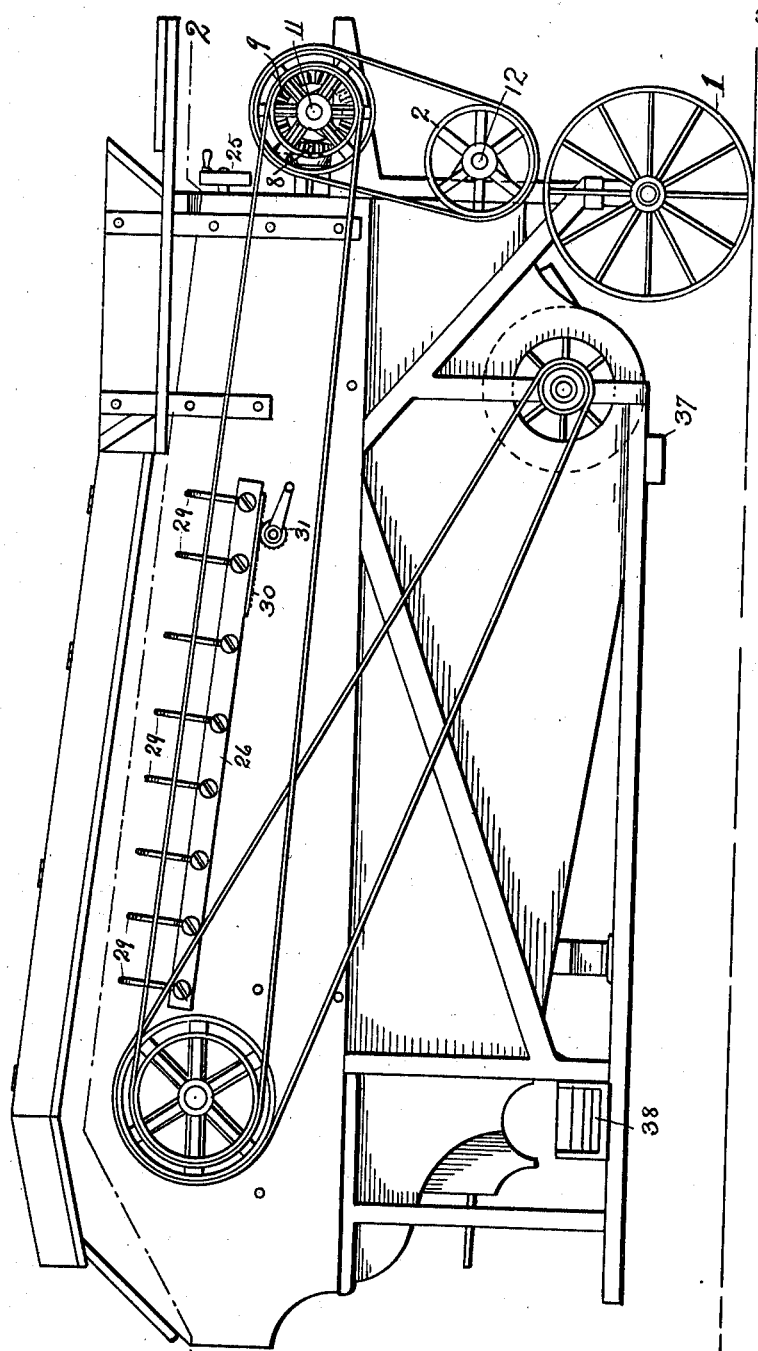

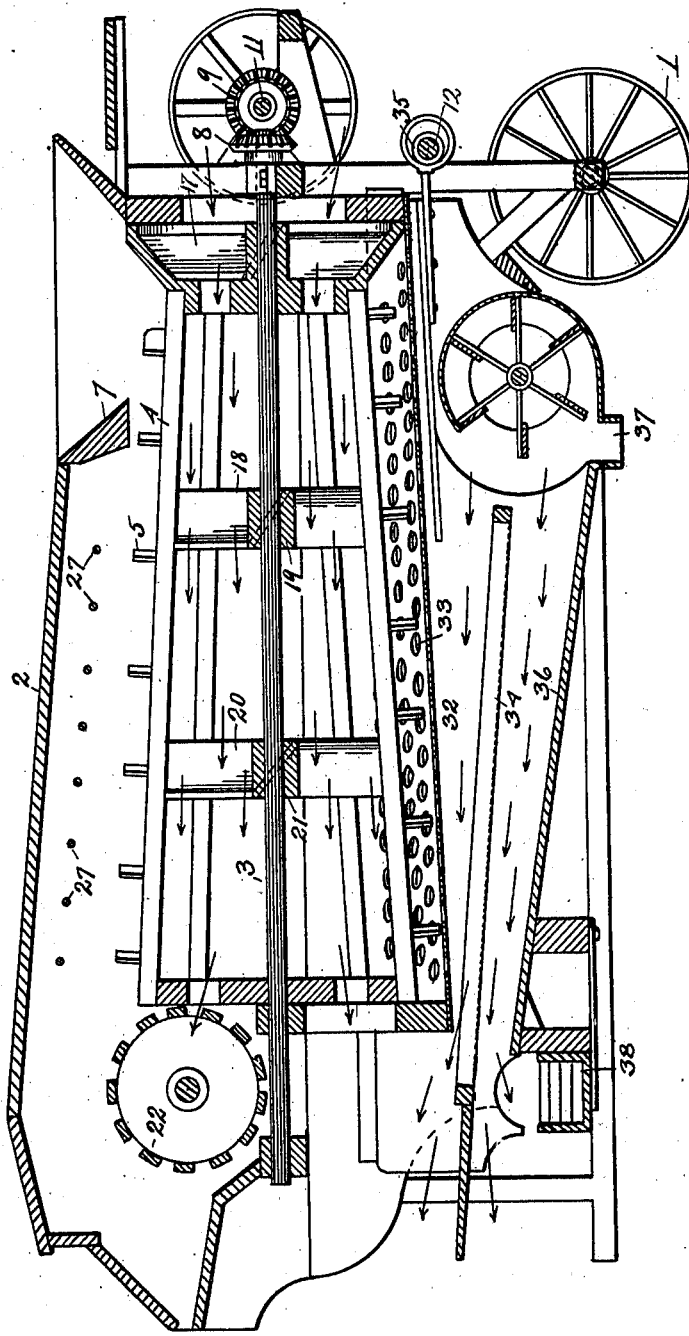

UNITED STATES PATENT OFFICE.

ALBERT REASON, OF PONTIAC, MICHIGAN.

THRESHING-MACHINE.

990,007.  Specification of Letters Patent.  Patented Apr. 18, 1911.

Application filed August 23, 1909. Serial No. 514,173.

*To all whom it may concern:*

Be it known that I, ALBERT REASON, a citizen of the United States, residing at Pontiac, county of Oakland, State of Michigan, have invented a certain new and useful Improvement in Threshing-Machines, and declare the following to be a full, clear, and exact description of the same, such as will enable others skilled in the art to which it pertains to make and use the same, reference being had to the accompanying drawings, which form a part of this specification.

This invention relates to threshing machines.

It has for its object an improved machine for threshing grains and for separating the grain from the straw and chaff.

In the drawings:—Figure 1, is a side elevation of the complete machine. Fig. 2, is a longitudinal vertical section. Fig. 3, is a longitudinal horizontal section with the cylinder in plan view. The section is along line 2—2 of Fig. 1. Fig. 4, is a detail side elevation of baffle rods used in connection with the cylinder. Fig. 5, is a cross section of one-half of the cylinder. Fig. 6, is a cross section of an adjustable bar which forms part of the concave.

In the threshing machine in which this invention is embodied the cylinder (so-called) or the shell turns on an axis that extends lengthwise of the main frame, and the cylinder itself increases in diameter from the front toward the rear. The concave corresponds, being in shape of the part of a hollow cone with the small end toward the front and the large end toward the rear. The straw from which the grain is to be threshed is fed into the cylinder and concave at the front end, which is the small end, and passes to the rear traveling around the cylinder which acts as a screw to force the straw along toward the rear of the machine while beating the grain out from it. The concave in this construction serves to retard the travel of the straw and subject it to complete threshing action. The straw under treatment is subjected during its passage to currents of air which are produced by fan structures that form part of the frame of the cylinder, and after the grain has been beaten from the straw it is subjected to a winnowing machine that in action differs very little from the ordinary winnowing machine.

The frame is mounted on wheels 1 for transportation and consists of a housing 2, central to which is a shaft 3 that extends from front to rear and carries a threshing "cylinder" which is made in the form of the frustum of a cone, except that it is made with bars as a skeleton and not as a solid conical structure. The small end of this frustum is toward the front, and the frustum itself consists of bars 4 provided with teeth 5, each one of which is made in the form of a blade having its long axis arranged diagonally to the bar 4, and these teeth revolve in circles that cut close to similar teeth 6 mounted on the walls of the concave.

The teeth 6 are arranged in a spiral line around the walls of the concave. At the forward quarter of the cylinder immediately under the mouth 7 through which the grain is fed into the cylinder the bars are provided with blades that are longer than the teeth 5 and which preferably are long enough to engage consecutive bars 4, these serve to cut and tear to pieces bands that are sometimes used to hold the straw in bundles, thus obviating the necessity of cutting the bands with a knife.

Motion is given to the cylinder by gear connections 8 and 9, of which 8 is a miter gear on the end of the shaft 3, and 9 is a miter gear to the counter-shaft 11 which is counter to the main driving shaft 12. The spider at the front end of the cylinder which holds the bars 4 to the shaft 3 is provided with fan blades 17 that act to force a current of air into the cylinder, and other fan blades 18 at the supporting spider 19, and 20 at the supporting spider 21 that causes the air current to travel along the axis of the cylinder and the centrifugal action acting on the air causes it to escape between the bars through the straw which is under treatment. At the rear of the cylinder a transverse skeleton drum 22 lifts the straw and carries it up to the top of the housing before it finally drops out at the tail of the machine. Longitudinal bar 23 that forms part of the concave is mounted on a longitudinal axis and its teeth 24 swing around the axis of the bar which is actuated by a hand wheel 25, and its teeth may thus be adjusted with reference to the teeth on the cylinder, regulating the distance between the teeth on this adjustable portion of the concave and the teeth on the cylinder.

At the side of the housing and external thereto is a bar 26 provided with a number of fingers 27, (long curved pieces of metal) that engage through the rib or bar 28, that forms part of the housing and project into the housing and curve over the cylinder. Each of the fingers 27 is provided at the part that engages through the housing with a part that is arranged horizontally and serves as an axis on which the fingers swing. The external part of the finger reaches to the bar 26 and is pivoted thereto. The internal part of the finger curves between and over the cylinder. The bar 26 is provided with a short rack 30 and is actuated by a lever pinion 31, and the bar actuated by the pinion serves to swing the fingers so that they may assume a position extending directly across the axis of the cylinder as shown in Fig. 3, or with their rising part inclined to the axis as shown in Fig. 4, or in any position intermediate the two. When these fingers are in the position shown in Fig. 3 they offer the least impediment to the movement of the straw in its travel along the cylinder. When they are in the position shown in Fig. 4 they present a much greater obstruction to the travel of the straw along the concave, and any adjustment between the two extremes may be arranged to produce the best results with the grain under treatment. The travel of the straw should be regulated in accordance with the character and condition of the straw. The bottom of the concave 32 is provided with perforations 33 through which the threshed grain drops on to a shaking screen 34 actuated by an eccentric 35 and from the screen 34 some part of the grain drops on to a floor 36 and is carried to the outlet 37 and some other part drops into the shaking cross trough 38 whence it may be delivered at the side of the machine, if desired.

The several movable parts are all driven either directly or indirectly from the lower belt wheel 12, and the system of belting by which the several movable parts are reached and driven does not form any part of this invention and may be made in any approved way.

What I claim is:—

1. In a threshing machine, in combination with a housing having a conical interior longitudinal of the machine provided with spirally arranged teeth and a feed opening at the smaller end, a rotatable shaft extending longitudinally thereof, a conical shell mounted on said shaft within said housing, blades arranged spirally of said shell in position to engage close to the said teeth on the housing when the shell is rotated and to form a spiral passage lengthwise of the housing and shell, and fans located within the cylinder, adapted to throw a current of air along the axis of the cylinder, substantially as described.

2. In a threshing machine, in combination with a housing having a conical interior longitudinal of the machine and provided with spirally arranged and inwardly extending teeth and a feed opening at the smaller end, a conical shell engaging therein, blades arranged spirally on said shell in position to engage close to the said teeth when the shell is rotated thereby forming a spiral passage lengthwise the housing and cylinder, a plurality of spiders supporting the periphery of said cylinder and having fan blades attached to their arms, and a rotatable shaft whereon said shell is mounted, substantially as described.

3. In a threshing machine, in combination with a cylinder having spirally arranged blades and teeth, and a housing with concave interior provided with spirally arranged teeth to correspond with the teeth of the cylinder, a plurality of retarding fingers adjustable at different angularities across the spiral passage formed by the said teeth, substantially as described.

4. In a threshing machine, in combination with a housing having a concave interior, a shell rotatably mounted therein and provided with interacting projections arranged to give to it an auger-like periphery, and a retarding bar having a plurality of fingers adjustable to different angularities across the auger-like periphery of the cylinder, substantially as described.

In testimony whereof, I sign this specification in the presence of two witnesses.

ALBERT REASON.

Witnesses:
CHARLES F. BURTON,
VIRGINIA C. SPRATT.